Figure 1:
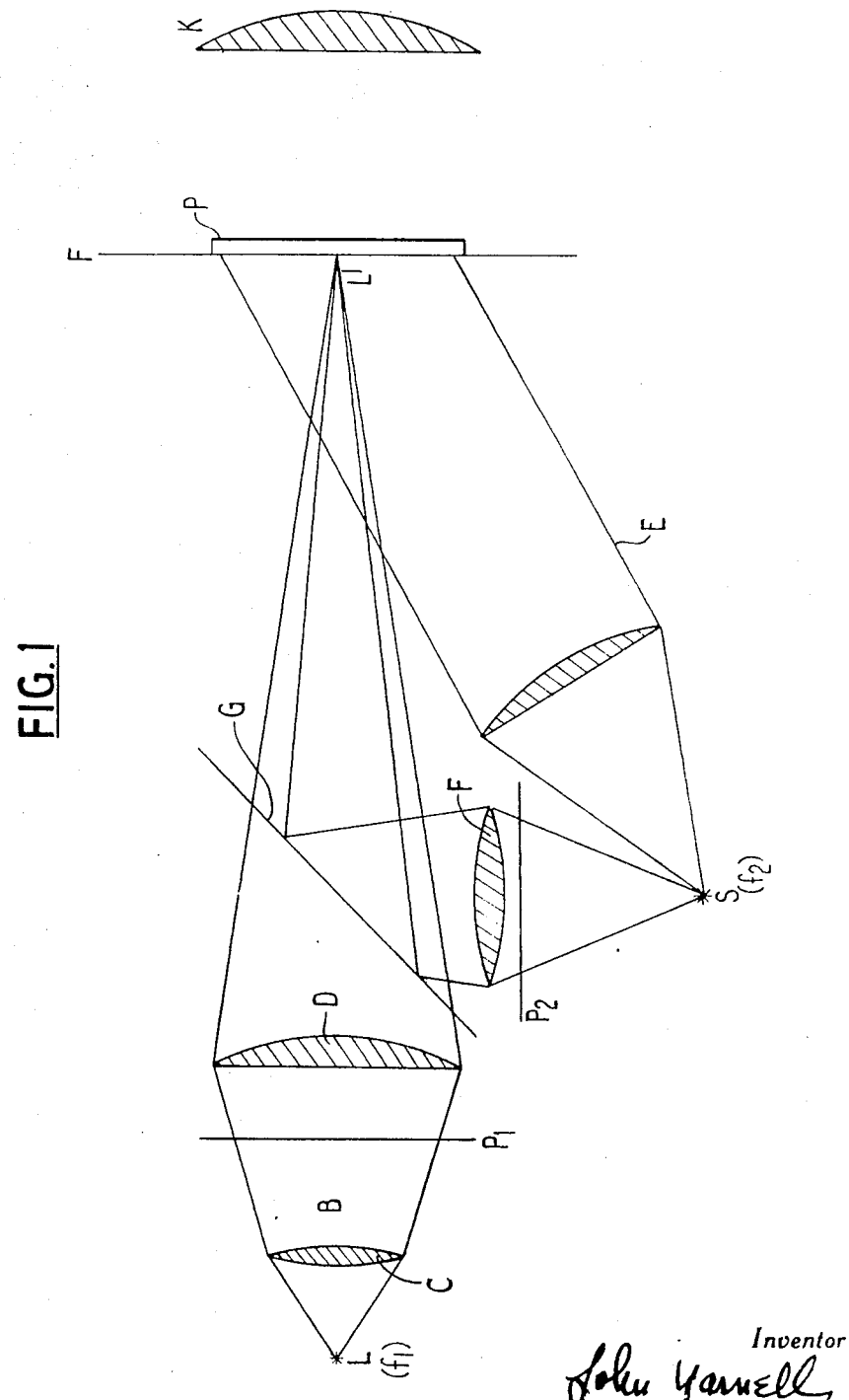

United States Patent

Yarnell

[15] 3,640,604
[45] Feb. 8, 1972

[54] OPTICAL INFORMATION PROCESSING METHOD EMPLOYING PHOTOCHEMICALLY GENERATED HOLOGRAMS AS SPATIAL FILTERS

[72] Inventor: John Yarnell, St. Albans, England

[73] Assignee: Hawker Siddely Dynamics Limited, Hatfield, England

[22] Filed: May 1, 1970

[21] Appl. No.: 31,856

Related U.S. Application Data

[63] Continuation of Ser. No. 649,594, June 28, 1967, abandoned.

[30] Foreign Application Priority Data

June 29, 1967 Great Britain......................29,298/66

[52] U.S. Cl.......................350/162 SF, 350/3.5, 350/160 P
[51] Int. Cl.......................G02b 27/22, G02b 5/18
[58] Field of Search............................350/3.5, 162 SF, 160 P

[56] References Cited

UNITED STATES PATENTS 3,085,469  4/1963  Carlson......................350/160 P UX

OTHER PUBLICATIONS

Vander Lugt, *IEE Trans. Inf. Theory,* pp. 139-145 (4/1964). [350-3.5]

Megla, *Applied Optics,* vol. 5, no. 6, pp. 945-960 (6/1966) [350-3.5]

*Primary Examiner*—David Schonberg
*Assistant Examiner*—Robert L. Sherman
*Attorney*—Dowell & Dowell

[57] ABSTRACT

This invention provides a novel method of optical information processing, using a photochromically generated hologram as a spatial filter. A diffraction pattern is produced on a photochromic plate which is simultaneously illuminated by a reference beam from a coherent source. A second diffraction pattern employing light from a coherent source is superimposed on the first diffraction pattern on the photochromic plate, so that the reference beam illumination and the second diffraction pattern form a photochromically generated hologram to modify the first diffraction pattern. A photochromic plate may comprise material that exhibits normally unpopulated triplet states of molecular energy, population of which can be induced by photons of appropriate energy.

2 Claims, 2 Drawing Figures

3,640,604

OPTICAL INFORMATION PROCESSING METHOD EMPLOYING PHOTOCHEMICALLY GENERATED HOLOGRAMS AS SPATIAL FILTERS

The application is a continuation of U.S. Pat. application Ser. No. 649,594, filed June 28, 1967, now abandoned.

Applicant claims priority rights with respect to British Provisional Specification No. 29,298 filed June 29, 1966 and also with respect to British Complete Specification filed June 28, 1967, under Section 119 of Title 35 patents (Public Law 593). Certified copies of both above British applications were filed in the U.S. Pat. Office under date of July 31, 1967 with respect to applicant's prior application Ser. No. 649,494 filed June 28, 1967, of which the present application is a continuation, and such priority documents were made of record therein.

DESCRIPTION OF INVENTION

This invention relates to optical systems, and more particularly to optical information processing by means of filters.

It is known that it is possible to modify the information passing through an optical system in a way analogous to the filtering which takes place in many electronic systems. Use is made of the fact that a transparency illuminated by coherent light which has, in effect, been derived from a point source or an approximation thereto, will produce diffraction effects which show themselves in a particularly useful way in the plane containing an image of the point source. It is not necessary that the light meeting the transparency should be collimated. It is easy to arrange that the disturbance in the image plane is the two-dimensional Fourier transform of the spatial distribution which constituted the transparent object. Distances measured radially from the central spot in this plane can be interpreted as being proportional to spatial frequency in the plane of the transparency, and filters inserted in the plane of the Fourier transform will modify it in such a manner that optical processing downstream of this plane will result in images of the transparency modified in a wide variety of possibly useful ways.

It is also well known that either amplitude filters, phase filters, or a combination of both may be used to produce these effects. A particularly useful form of filter is the hologram, which in general is so constructed that a filter which has no phase-changing properties but is only capable of modifying amplitudes can none the less be made to store information about both phase and amplitude of an optical wave front. This is frequently done by illuminating a photographic plate with coherent diffracted light and simultaneously with a reference beam, which in general need not be parallel, which is also coherent with the diffracted light. If we wish to form the cross-correlation function of any two patterns $P_1$ and $P_2$, it may be done by throwing the diffraction pattern of $P_1$ on to the hologram made by diffraction from $P_2$, or vice versa, and by means of a lens performing the inverse Fourier transformation process on the resultant wave front. In this way, a pattern of light will appear in the output plane, the intensity distribution of which represents the cross-correlation function between $P_1$ and $P_2$. This process is useful in pattern recognition and may also be useful as a means of performing a generalized mathematical operation. It should be noted that a second output from this system is the convolution function of $P_1$ and $P_2$ and this may also be useful.

It is also known that certain materials exhibit the phenomenon of photochromism, by which is meant that on receiving radiation the material changes in a manner which may be partly or wholly reversible to a substance or condition possessing a different absorption spectrum. This change may occur in one of several ways; for example the incident radiation may cause a change in spatial configuration of a complex molecule, or cause an interatomic bond to rupture. An electronic process involving the artificial population of a normally unpopulated electron level, so that absorption may now take place between that level and other available levels, could also be considered a photochromic change. In both molecular processes, and the type of electronic process mentioned, the effect is that radiation of certain wavelengths will induce new features in the absorption spectrum. It has been proposed to use molecular changes employing incident radiation at least a major portion of the spectrum of which lies outside the visible light spectrum, as a means of producing a filter for the purpose of modifying the optical Fourier transform as described above (see United Kingdom Pat. No. 935,186).

According to the present invention there is provided an optical system wherein a hologram photochromically generated is employed as a spatial filter. More specifically, a diffraction pattern is produced on a photochromic plate which is simultaneously illuminated by a reference beam from a coherent source, and a second diffraction pattern employing light from said coherent source is superimposed on the first on said plate, whereby the reference beam illumination and the second diffraction pattern form a hologram to modify the first diffraction pattern. The frequency of the light from the reference source, while preferably different from that employed in the production of the first diffraction pattern, nevertheless need not be outside the visible spectrum.

Figure 2:
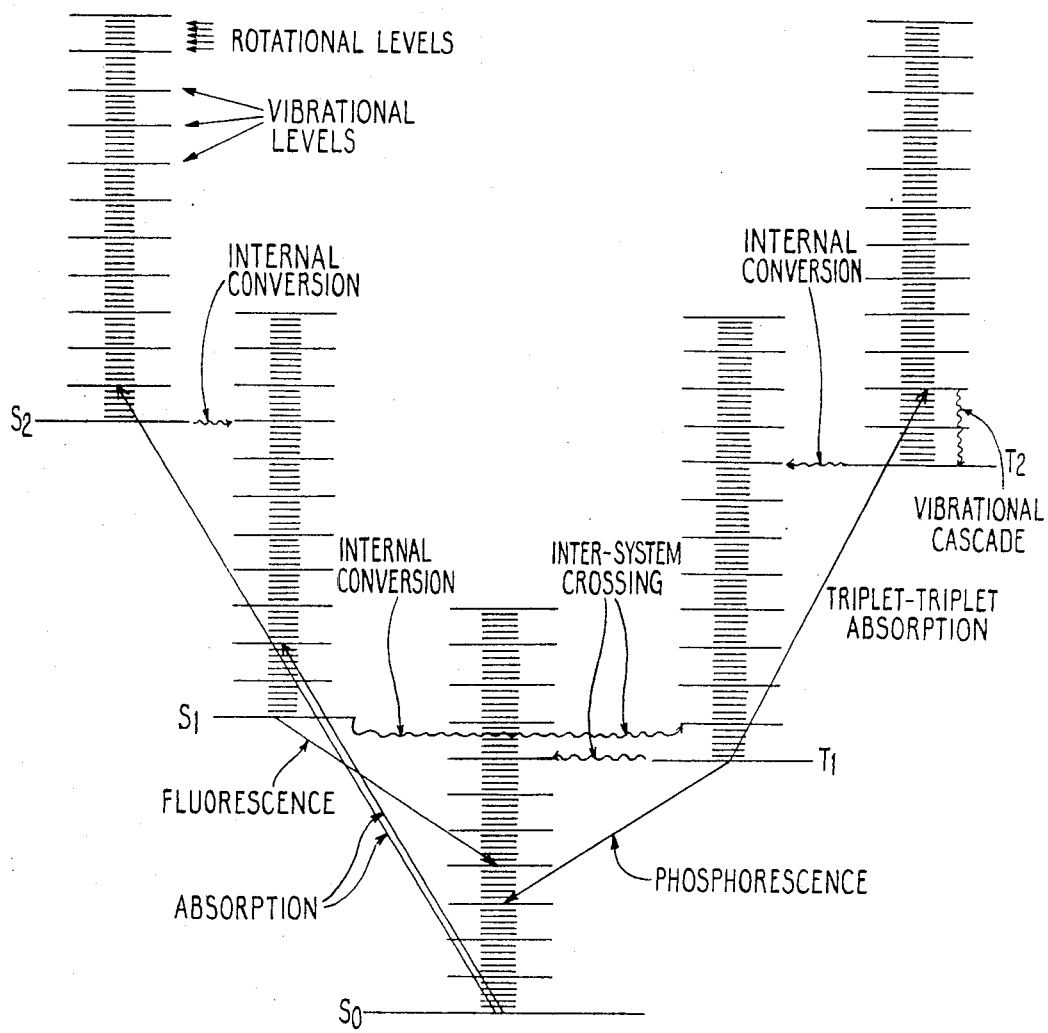

One arrangement in accordance with the invention will now be described by way of example, reference being had to the accompanying drawings, in which:

FIG. 1 is a diagram of an optical system for carrying the invention into effect, and FIG. 2 is a molecular energy diagram.

Reference is made first to FIG. 1.

A coherent light source L of frequency $f_1$ produces a beam B, not necessarily parallel, which is brought by lenses C, D to a focus L' in a plane F which also contains a filter plate P. Somewhere along the path of the light from L to its image L' a transparency $P_1$ is introduced which will produce a diffraction pattern on the plate P. Simultaneously from a second coherent source S, not necessarily of the same frequency as the source L, the plate P is illuminated with a reference beam E, again not necessarily parallel. The source S is caused simultaneously by means of a lens F and a partially reflecting plate G to throw a point image into the plane F at the point L', and a transparency $P_2$ is caused to produce diffraction pattern around the point L'. If the plate P is made of a photochromic material, which may be excited in the way described above by a frequency $f_2$, and if the source S has that frequency then the combined action of the direct beam E from the source S and that arriving via the transparency $P_2$ will be such that the photochromic plate P will be rendered less transparent in certain areas as has been described for the manufacture of holograms by the photographic method. The light from the source L having been diffracted by the transparency $P_1$ and modified by the plate P may now be subjected to any desirable optical processing, typically by the action of a lens K which will in effect take the inverse Fourier transform of the modified beam and thereby produce a pattern constituting the cross-correlation function or one of many other functions of the two patterns $P_1$ and $P_2$.

The optical arrangement shown in FIG. 1 is not the only one possible but all will have the feature that the diffraction pattern from the transparency $P_1$ will be formed and that in the same plane as this diffraction pattern, a photochromic plate used to form a hologram by the use of the diffraction pattern from the transparency $P_2$ and a reference beam S will be employed to modify the diffraction pattern from the transparency $P_1$, or that by similar means another filtering function will be formed in the plane F.

Where coherent light is mentioned herein, it is, of course, to be understood that completely coherent light has never been produced and the use of the word "coherent" is meant to denote light with an adequate coherence length.

Optical processing of the light beyond the plate P may not involve the use of any optical component; merely allowing light of a certain distribution in one plane to travel on to some other plane and thereby exhibit a different distribution may be regarded as a processing operation.

Where interaction of diffracted light with a reference beam to produce a hologram is to take place, the reference beam need not necessarily proceed by a route distinct from that taken by the diffracted light. Holograms can be made from a single beam providing both diffracted and undiffracted light, although use of a separate reference beam is perhaps more usual.

The frequency $f_2$ of the light source S is not necessarily even partially outside the visible spectrum and the beam from the source L where it encounters the transparency $P_1$ need not be collimated. Those are believed to be novel features. Furthermore the employment of a hologram in the plane P rather than a simple filter is also a novel feature. Also the proposal to use in such a system materials in the photochromic plate whose photochromic action depends on a particular type of electronic rearrangement is novel, and a description of the electronic mechanism follows.

An electronic state of an organic molecule which possesses zero total angular momentum due to electron spin is known as a singlet state. Most organic molecules possess an even number of electrons and their unexcited ground state is a singlet state. A singlet ground state will be assumed in this description. Other singlet states of higher energy can be populated by the absorption by the ground state of radiation of the appropriate wavelength. The normal absorption spectrum of a substance, as measured by the more conventional methods of spectroscopy, is due to electronic transitions between singlet states (and vibrational-rotational changes).

When the quantum number describing the total angular momentum of the electron spin of the molecule has a value of unity, the molecule is said to be in a triplet state. A series of triplet electronic energy levels population and transitions between these levels lead to triplet-triplet absorption spectra.

The change from the singlet state to the triplet state, and the reverse change, are governed by the intercombination selection rule which prohibits transitions between states of different multiplicity. This rule is only partially obeyed, and populations of the triplet level system occurs, on excitation, mainly via the lowest excited singlet level. A typical energy level diagram is shown in FIG. 2. The relative positions of the levels vary with the molecule, but the lowest triplet level possesses less energy than the lowest excited singlet level. The "prohibited" nature of the triplet to singlet crossover leads to the lifetime in the triplet state being several orders of magnitude greater than the lifetime of any excited singlet level. Transition to the ground state from the lowest triplet level can result in the emission of phosphorescence.

It is proposed to use the triplet-triplet spectrum of an organic molecule as one mechanism of transient absorption in the photochromic plate. Irradiation of the plate by radiation of a frequency sufficient to transfer molecules of the first excited singlet level, or a higher frequency, would cause the lowest triplet level to become populated (such a frequency is $f_2$). Irradiation could be either constant or intermittent. The molecules in the triplet state would then absorb radiations of a second frequency $f_1$ corresponding to a triplet-triplet transition. If the triplet forming radiation, of frequency $f_2$, incident on the plate is distributed in intensity in the form of a pattern, a distribution of optical density as seen by light of frequency $f_1$ is produced. This distribution of optical density bears a close relation to the $f_2$ intensity pattern.

The active element of the photochromic plate will consist of a dispersion of the organic compound in question in another matrix, which could be either solid or fluid.

In certain cases a pattern or subject, from which a diffraction pattern is to be produced, is not transparent or cannot be illuminated adequately with coherent light, or it has a diffusing surface. In such an instance the pattern may, according to a further aspect of the invention, be illuminated with coherent or incoherent light of a suitable wavelength and an image of the pattern so illuminated thrown upon a photochromic plate. By a suitable arrangement of partially reflecting plates it can be arranged that coherent radiation as well as the incoherent radiation can be caused to arrive at the plate so that the transparency formed thereon by the action of the incoherent light will modify the transmitted coherent light. Should it be desirable that only one of two radiations should continue through a further optical system downstream of the plate, either of the beams may be selectively absorbed or deflected laterally.

I claim:

1. A method of processing optical information, using a hologram as a spatial filter, comprising producing a first diffraction pattern on a photochromic plate by illumination of an object disposed in a beam of coherent light which is uncollimated, simultaneously illuminating the photochromic plate by a reference beam from a coherent source of light of a frequency different from that employed in the production of said first diffraction pattern and lying substantially entirely within the visible spectrum, and superimposing a second diffraction pattern employing light from said coherent source of visible light on said first diffraction pattern on said photochromic plate, whereby the reference beam illumination and said diffraction pattern form a photochromically generated hologram to modify said first diffraction pattern.

2. A method of processing optical information, using a hologram as a spatial filter, comprising producing a first diffraction pattern on a photochromic plate by illumination of an object disposed in a beam of coherent light which is uncollimated, said photochromic plate incorporating material that exhibits normally unpopulated triplet states of molecular energy population of which can be induced by photons of visible light energy, simultaneously illuminating the photochromic plate by a reference beam from a coherent source of light lying substantially entirely within the visible spectrum and containing said photons for inducing population of the triplet states of said photochromic plate material with normally unpopulated triplet states, and superimposing a second diffraction pattern employing light from said coherent source of visible light on said first diffraction pattern on said photochromic plate, whereby the reference beam illumination and said second diffraction pattern form a photochromically generated hologram to modify said first diffraction pattern.

* * * * *

UNITED STATES PATENT OFFICE
CERTIFICATE OF CORRECTION

Patent No. 3,640,604          Dated February 8, 1972

Inventor(s) John Yarnell

It is certified that error appears in the above-identified patent and that said Letters Patent are hereby corrected as shown below:

In the heading of the above patent, change the date of filing of the British priority application to read "June 29, 1966" (rather than June 29, 1967).

Signed and sealed this 13th day of June 1972.

(SEAL)
Attest:

EDWARD M. FLETCHER, JR.        ROBERT GOTTSCHALK
Attesting Officer              Commissioner of Patents